United States Patent
Dennis et al.

(10) Patent No.: US 7,359,730 B2
(45) Date of Patent: Apr. 15, 2008

(54) METHOD AND APPARATUS FOR REDUCING INTERFERENCE ASSOCIATED WITH WIRELESS COMMUNICATION

(75) Inventors: Gary J. Dennis, Duluth, GA (US); Steven M. Cohen, Piscataway, NJ (US); James L. Dixon, Bridgewater, NJ (US)

(73) Assignee: Telecordia Technologies, Inc., Piscataway, NJ (US)

( * ) Notice: Subject to any disclaimer, the term of this patent is extended or adjusted under 35 U.S.C. 154(b) by 564 days.

(21) Appl. No.: 11/118,673

(22) Filed: Apr. 29, 2005

(65) Prior Publication Data

US 2006/0246841 A1 Nov. 2, 2006

(51) Int. Cl.
*H04B 7/00* (2006.01)

(52) U.S. Cl. .................. 455/522; 455/442; 455/69; 370/335

(58) Field of Classification Search .............. 455/522, 455/442, 69; 370/335, 331, 332, 333, 334; 375/148
See application file for complete search history.

(56) References Cited

U.S. PATENT DOCUMENTS

| | | | | |
|---|---|---|---|---|
| 5,999,832 | A * | 12/1999 | Vannatta et al. | 455/575.1 |
| 6,236,365 | B1 * | 5/2001 | LeBlanc et al. | 342/457 |
| 6,807,429 | B2 * | 10/2004 | Subrahmanya | 455/522 |
| 6,907,229 | B2 * | 6/2005 | Shpak | 455/69 |
| 7,212,790 | B2 * | 5/2007 | Furukawa | 455/83 |
| 7,257,406 | B2 * | 8/2007 | Ji | 455/450 |
| 2003/0190892 | A1 * | 10/2003 | Shimada et al. | 455/63.1 |
| 2004/0082356 | A1 * | 4/2004 | Walton et al. | 455/522 |
| 2004/0097223 | A1 * | 5/2004 | Bellec et al. | 455/422.1 |
| 2005/0083999 | A1 * | 4/2005 | Koo et al. | 375/148 |
| 2006/0063554 | A1 * | 3/2006 | Scharf-Katz et al. | 455/522 |
| 2006/0084444 | A1 * | 4/2006 | Kossi et al. | 455/450 |
| 2006/0188004 | A1 * | 8/2006 | Kizu et al. | 375/132 |

* cited by examiner

*Primary Examiner*—Matthew Anderson
*Assistant Examiner*—Minh Dao
(74) *Attorney, Agent, or Firm*—William A. Schoneman

(57) ABSTRACT

The present invention provides for a method and apparatus for reducing interference associated with wireless communication in an area having sensitive electronic equipment. A wireless communications device receives, from an access point, a signal having a signal strength above a predetermined threshold. The wireless communications device determines a transmission power level maximum based on the received signal and then transmits a signal to the access point at a transmission power level at or below the transmission power level maximum. The wireless communications device disables the transmission when the signal strength falls below the predetermined threshold.

20 Claims, 5 Drawing Sheets

| ACCESS POINT MAC ADDRESS | SIGNAL STRENGTH THRESHOLD | TRANSMISSION POWER LEVELS (dBm) |
|---|---|---|
| 006097981E6B | 25% | -3 |
| 00609912FEB2 | 20% | 3 |
| 006066214328 | 15% | 9 |
| 04508712C1B8 | 10% | 14 |

512 — row 1, 514 — row 2, 516 — row 3, 520 — row 4
502 — col 1, 504 — col 2, 506 — col 3

METHOD AND APPARATUS FOR REDUCING INTERFERENCE ASSOCIATED WITH WIRELESS COMMUNICATION

BACKGROUND OF THE INVENTION

The present invention relates generally to wireless communications, and more particularly to reducing interference associated with wireless communications.

Wireless communication has been an active area of technology development. One wireless technology is wireless local area network (WLAN) systems, exemplified by the IEEE 802.11 and HiperLAN standards, also called wireless fidelity, or "Wi-Fi", networks. In particular, Wi-Fi networks have gained acceptance in many businesses, agencies, schools, and homes as an alternative to a wired local area network. Further, many airports, hotels, cafes, and other facilities now offer public access to Wi-Fi networks (i.e., hot spots).

Wi-Fi networks are typically composed of access points. A conventional access point is a station that transmits and receives data and connects users to other users within the network. An access point can also serve as the point of interconnection between the wireless network and a fixed wire network. To improve the quality of wireless communications (e.g., to improve the reception of a mobile wireless device attempting to connect to the Wi-Fi network) and to maximize the coverage associated with an access point, access points are typically engineered to output the highest possible transmission power level within allowable limits.

Similarly, mobile wireless devices typically utilize whatever power is necessary within the allowable maximum to provide the highest quality of communications with an access point. As the mobile wireless device moves further away from an access point, and, consequently, as the signal strength received by the mobile wireless device from the access point decreases, the mobile wireless device traditionally increases its output transmission power to maintain the communications with the access point.

In some environments, there is highly sensitive electronic equipment that may be sensitive to electromagnetic interference. If the electronic equipment experiences interference, the electronic equipment may malfunction or halt its operation, with possible detrimental effects. For example, if a piece of electronic equipment in a hospital is monitoring a patient's vital signs, incorrect readings can result in a misdiagnosis. Similarly, if electronic equipment in a telecommunications equipment building experiences electromagnetic interference, the interference may result in an alarm and the equipment may shut down. The failure of such equipment may have a detrimental and costly effect. For example, the failure or malfunctioning of telecommunications equipment may impact service provided to thousands of customers.

Nonetheless, enabling use of wireless devices in these environments can provide many benefits. For example, enabling people to operate a handheld device without being restricted to a wired machine can provide substantial cost savings and significant service improvements. For example, in a central office (CO) of a telecommunications equipment building, technicians may have to walk to a particular terminal to determine the jobs that they have to work on. This terminal may be, for example, on the first floor of a CO. The location of the job, however, may be on the third floor of the CO. At some later time, the technician walks back to the terminal to enter the status of each job worked on thus far. Thus, the technician often has to walk to and from the terminal several times each day in order to update the job status for each job. These frequent walks to and from the terminal waste the technician's time. The telecommunications provider may consequently lose money because of the time delay between when the technician actually finishes the job and when the technician updates the job status on the terminal. Up to date job status, such as whether the job is completed or whether the hospital bed is ready, therefore, is often extremely relevant to reduce rework and to more efficiently use resources. Up-to-date job status can also be made available to customers for better customer service.

A technician carrying a wireless device, however, can update the job status in real-time once the technician has completed the job. The wireless device can then transmit the updated status to the terminal. Moreover, the technician does not have to walk back and forth between the job location and the terminal. Further, jobs can be transmitted to the technicians without having the technician walk back to the terminal. This is especially beneficial if inaccurate completion times create parity issues between competitors that share common carrier equipment. Parity violations due to inaccurate completion methods may lead to fines and penalties.

People carrying a wireless device in other buildings housing sensitive equipment experience similar benefits. For example, a doctor carrying a wireless device in a hospital can update the status of a patient immediately after examining the patient without walking back to a central area (e.g., the main desk) or computer (e.g., at the doctor's desk). Thus, a receptionist can begin processing the patient's information as soon as the doctor transmits the information via the doctor's wireless device. Similarly, a scientist in a nuclear power plant or in a research laboratory can, for example, wirelessly communicate results to other scientists without being limited to a central computer (or computers tethered to wired networks). These advantages, however, may not be realized in these buildings due to interference problems.

One solution to prevent interference to important, sensitive electronic equipment often greatly restrains individuals working around the equipment. In particular, building management typically does not allow any device that may generate interference to be taken into the building because of the cost and effect on service associated with interference. Thus, wireless devices such as pagers, cellular telephones, laptops, and personal digital assistants (PDAs) are not allowed in these buildings, thus keeping the building immune from interference.

Another solution to the problem associated with interference is to notify people (e.g., with signs or announcements) to shut off their wireless devices before they enter a room containing sensitive equipment or not to get within a particular distance of any piece of equipment. This solution is often ineffective, as people forget to follow (or ignore) the rule and cause interference.

Companies have also found that different pieces of sensitive equipment have different vulnerabilities to different frequencies and power levels of RF emissions. In other words, one particular frequency range and power level range may introduce more problems to one piece of sensitive equipment relative to another piece of sensitive equipment. To test every possible frequency and power level across all potential equipment, however, is an extremely burdensome and impractical task. Further, it may be impossible to find a frequency and power range that does not interfere with any equipment in a building.

Thus, there remains a need to reduce the interference associated with wireless devices in areas having sensitive electronic equipment in order to provide wireless capability to these areas and to accomplish that in an automated way to decrease the possibility of human error.

BRIEF SUMMARY OF THE INVENTION

While the prior approaches attempt to control interference associated with wireless communications devices in areas having sensitive electronic equipment, they fail to enable the use of wireless communications devices in an area having sensitive equipment without imposing restrictive or impractical practices.

The present invention provides for a method and apparatus for reducing interference associated with wireless communication in an area having sensitive electronic equipment and does so in an automated fashion. Interference is reduced because a wireless communications device transmits at or below a transmission power level maximum when in a particular area related to the sensitive electronic equipment. When the wireless communications device moves closer to the sensitive electronic equipment, the wireless communications device automatically, and without human error, turns off its transmitter.

In particular, a wireless communications device receives, from an access point, a signal having a signal strength above a predetermined threshold. The wireless communications device determines its transmission power level maximum based on the received signal and then transmits a signal to the access point at a transmission power level at or below the transmission power level maximum. The wireless communications device disables its transmitter and notifies the device user when the signal strength it receives from the access point falls below the predetermined threshold because the device is likely in a sensitive equipment environment.

In one embodiment, the wireless communications device determines the transmission power level maximum for its area of wireless communications directly from information contained in the signal received from the access point. Alternatively, the wireless communications device determines a transmission power level by determining an access point identifier from the signal received from the access point. The wireless communications device then uses the access point identifier to retrieve one of the transmission power level and a signal strength threshold from a database. The database stores a list of access point identifiers, signal strength thresholds, transmission power levels, and/or job information (e.g., job, job status, and time).

The area having the sensitive electronic equipment can be divided into zones of coverage. In particular, the area can be divided into a full coverage zone, a limited coverage "buffer" zone, and a non-coverage zone. The full coverage zone enables the wireless communications device to transmit signals to and receive signals from the access point. The wireless communications device determines that it is in the full coverage zone by the signal strength of the signal received from the access point being above the predetermined threshold. When the signal strength falls below the predetermined threshold, the wireless communications device will not transmit, as it is located in either the limited coverage zone or the non-coverage zone.

BRIEF DESCRIPTION OF THE DRAWINGS

FIG. 5 shows a data structure which may be used to store information associated with a wireless communications device in a database.

DETAILED DESCRIPTION

Figure 1:
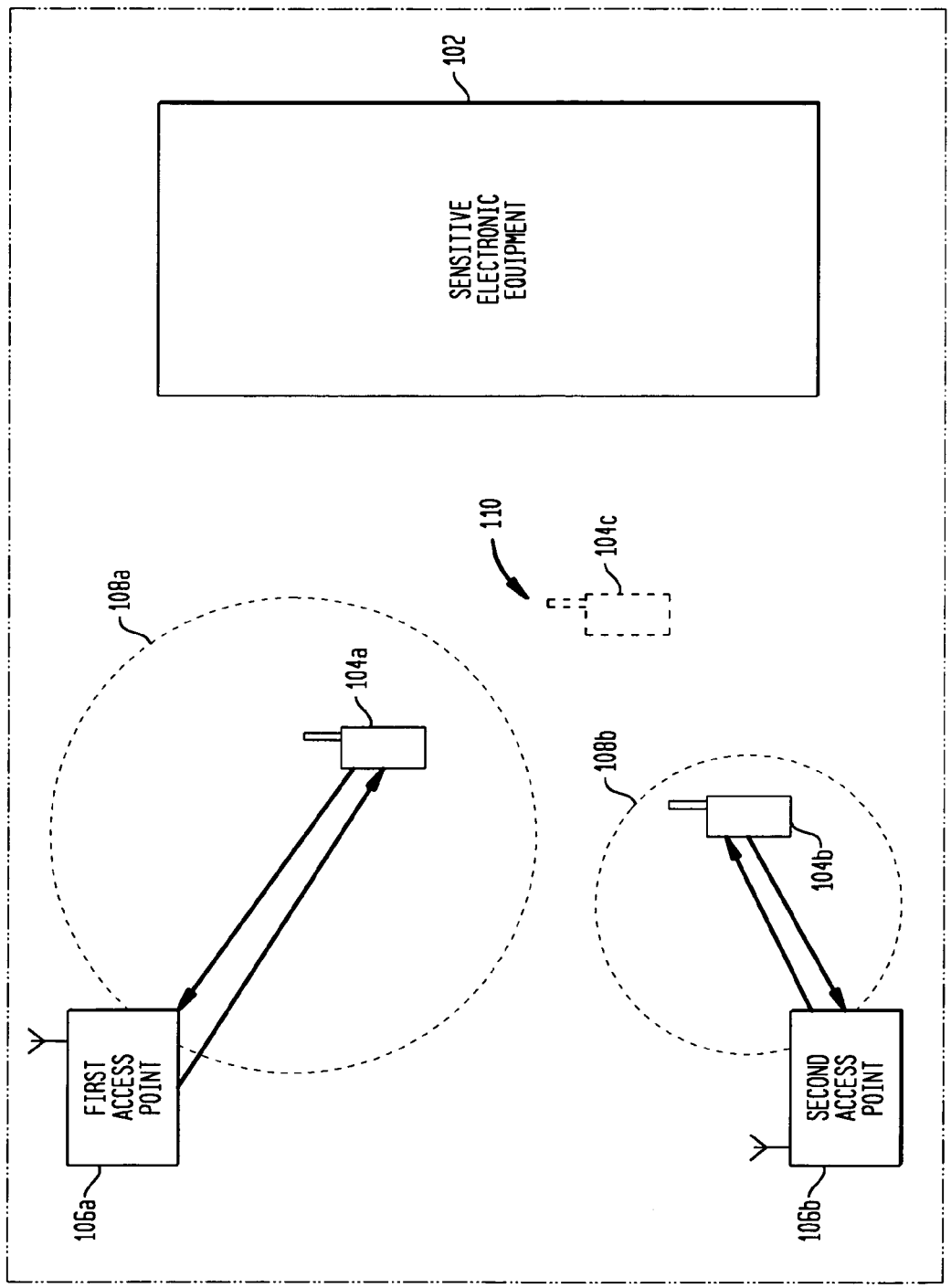
FIG. 1 shows a high level block diagram of an area having sensitive electronic equipment in accordance with an embodiment of the invention.

FIG. 1 shows a high level block diagram of an area having sensitive electronic equipment in accordance with the principles of the present invention. Further details regarding particular embodiments of the invention will be described in further detail in connection with FIGS. 2-5.

FIG. 1 shows an area 100 having sensitive electronic equipment 102. The area 100 may be any building or area having equipment 102 sensitive to interference from wireless communications. For example, the area 100 may be a telecommunications building, such as a central office (CO), having sensitive telecommunications equipment 102 such as call switching and transmission equipment. The area 100 may also be a hospital having sensitive medical equipment (e.g., a heart monitor). Other examples of the area 100 include a gas/oil company having sensitive (e.g., flammable) materials/chemicals, a nuclear facility having sensitive equipment/chemicals, or a laboratory having sensitive lab equipment or materials.

As described above, wireless communications devices such as personal digital assistants (PDAs), cellular telephones, laptops, email devices, and pagers are generally not allowed near the sensitive electronic equipment 102 to prevent electromagnetic interference. Alternatively, owners of wireless devices are notified (e.g., via an announcement or a sign) that all wireless devices must be turned off before going near the sensitive wireless equipment 102. If someone forgets to turn off their wireless device and walks too close to the sensitive electronic equipment 102, the wireless device emits enough power to cause interference with the equipment 102. For example, if a wireless device emits 100 milliwatts (mW) of power, interference occurs for certain types of equipment when the user of the device is within 20 inches of the sensitive equipment 102.

Moreover, if a wireless communications device moves outside of the range of a coverage area provided by an access point, the wireless communications device typically increases its power output in an attempt to maintain its communication with the access point or to find coverage from another access point. For example, in order to find another access point, a wireless device may increase its power output from 20 mW to 100 mW and then repeatedly transmit a probing signal at this increased power setting. In accordance with an embodiment of the invention, area 100 is designed to provide no wireless signal coverage within a particular distance of the sensitive equipment 102 and defined areas of coverage further away from the sensitive equipment 102. A first wireless communications device 104a communicates with a first access point 106a providing wireless coverage within a first coverage area 108a. A second wireless communications device 104b communicates with a second access point 106b providing wireless coverage within a second coverage area 108b. Each wireless communications device 104a, 104b (generally 104) includes a transmitter for transmitting signals and a receiver for receiving signals. The transmitter and receiver may be a single device or may be multiple devices, and are separately controllable. The wireless communications may occur with, for instance, any of the 802.11 technologies, such as 802.11n Multiple-In, Multiple-Out (MIMO) technologies. Further, the invention may apply to any wireless personal area network (i.e., 802.15). For example, the invention may be used with Radio Frequency Identification (RFID) transmitters or Bluetooth transmitters.

Moreover, instead of a wireless communications device transmitting signals to an access point at the maximum allowable power level, each wireless communications device 104 determines a transmission power level maximum based on the signal received from an access point 106a, 106b (generally 106) and transmits a signal to the access point 106 at a transmission power level at or below the transmission power level maximum. This maximum transmission level can be stored in a database or transmitted as part of the signal from the access point 106.

When the wireless communications device 104 moves outside of the coverage area 108a, 108b (generally 108) of the access point 106 (e.g., to area 110), the wireless communications device 104c detects that the signal received from the access point 106 drops below a predetermined threshold. In accordance with the principles of the present invention, the wireless communications device 104 automatically turns off its transmitter when the device 104 makes this determination. The receiver of the wireless communications device does not turn off so that the wireless communications device can still determine if it moves back into an area 108 covered by an access point (by detecting the received level of the signal(s) transmitted by the access point). Thus, any wireless communications device 104 that moves within a predetermined area close to the sensitive electronic equipment 102 and therefore not covered by an access point 106 (i.e., the received signal drops below the predetermined threshold) automatically shuts off its transmitter.

The wireless communications device 104 does not therefore transmit any beaconing or probing signals when it is in an area not covered by an access point 106. The access points 106 can be set to transmit at a number of power levels. In particular, these access points 106 can operate at different power levels and be configured to cover different areas. Moreover, although shown with two access points 106, the first and second coverage areas 108 may be covered by any number of access points (e.g., a single access point with multiple antennas).

A user of the wireless communications device 104 can therefore roam around the area 100 with a wireless communications device 104 without interfering with the sensitive electronic equipment 102. In particular, the first access point 106a can be set to transmit at a first power level. When the technician moves into the coverage area 108 of the access point 106, the wireless communications device 104 determines that the maximum power level it should transmit at is the first power level. The wireless communications device 104 sets its transmission power output to the first power level and communicates with the access point 106a at this power setting. As the wireless communications device 104 roams to area 108b, which is set to transmit at a second power level, the wireless communications device 104 automatically adjusts its transmission power output to the second power level. As a result, when the wireless communications device 104 is in the coverage area 108 of the access point 106, the transmission power output of signals transmitted by the wireless communications device 104 is set to a level that will not harm the sensitive electronic equipment 102, because the areas and powers are engineered to be safe.

When the user moves outside of the coverage area 108, the wireless communications device 104 automatically disables its transmitter. Thus, the user does not have to worry about turning off the wireless communications device or about particular rules for the area 100. Instead, the wireless communications device 104 is configured to enable wireless communication inside an area 100 having sensitive electronic equipment 102 without detrimentally interfering with the equipment 102.

Figure 2:
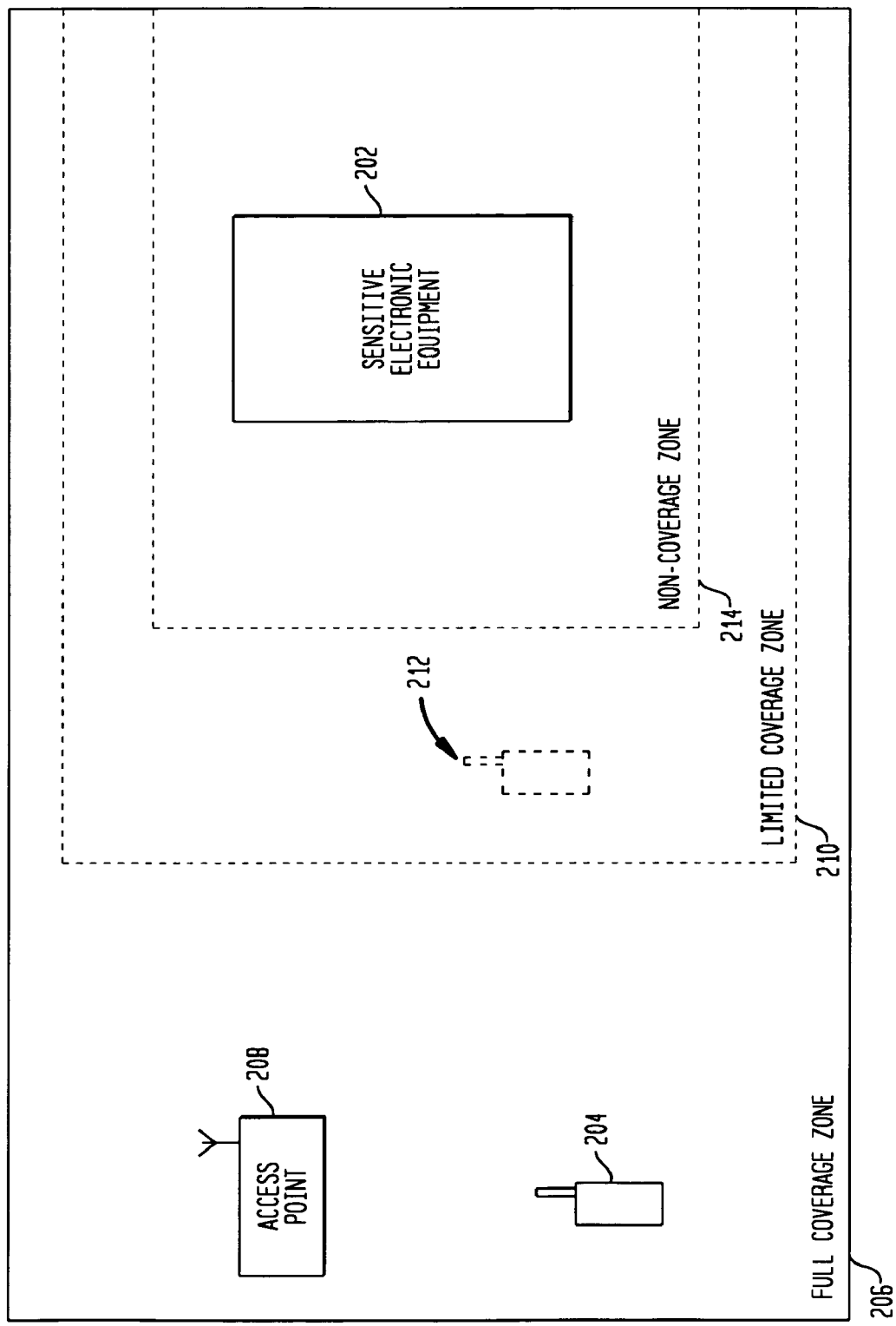
FIG. 2 shows a high level block diagram of an area having sensitive electronic equipment and divided into zones of coverage in accordance with an embodiment of the invention.

FIG. 2 shows a high level block diagram of an area 200 having sensitive electronic equipment 202 and divided into zones of coverage in accordance with an embodiment of the invention. The zones of coverage can be associated with the location of the zone with respect to the sensitive electronic equipment 102 in order to enable wireless communication capabilities while reducing interference associated with these communications. Wireless communications device 204 is configured to operate differently in different zones of coverage in order to reduce interference associated with wireless communication in the area 200.

A full coverage zone 206 supports full communication between an access point 208 and the wireless communications device 204. The full coverage zone 206 is typically located a predetermined distance away from the sensitive electronic equipment 202 to enable full wireless communication between the wireless communications device 204 and the access point 208. The distance between the full coverage zone 206 and the sensitive electronic equipment 202 may be established by building or area requirements. In the full coverage zone 206, the wireless communications device 204 receives a signal from the access point 208 and, based on this signal, determines a maximum power level to communicate with the access point 208. The wireless communications device 204 then transmits signals to the access point 208 at or below the determined maximum power level. The full coverage zone 206 can be provided by one or more access points operating at one or more power levels.

When the mobile wireless communications device 204 is moved beyond the full coverage zone 206 to a second position 212, the mobile wireless communications device enters a limited coverage zone 210. The limited coverage zone 210 may support the receipt of information by the wireless communications device but does not permit the wireless communications device to transmit signals (e.g., user updates) to the access point 208. Further, the buffer zone may be an area where signal bleed over is allowable. The mobile wireless communications device determines that it is in a limited coverage zone 210 based on the power level of the signal received from the access point 208. Thus, the device determines that it is not allowed to transmit. In one embodiment, the mobile wireless communications device is configured with a predetermined power level threshold. When the mobile wireless communications device receives a signal from the access point 208 that is below the predetermined threshold, the wireless communications device recognizes that it is in a limited coverage zone 210 and disables its transmitter. The receiver of the wireless communications device remains active (i.e., powered on) to locate a full coverage zone as the wireless communications device moves around.

As the mobile wireless communications device moves closer to the sensitive equipment 202, the device enters a non-coverage zone 214. The non-coverage zone 214 does not support either transmission or receipt of information between a mobile wireless communications device and access point 208. In particular, the signal strength received by the wireless communications device in the non-coverage zone 214 is not strong enough to support either transmission or receipt of information by the mobile wireless communications device. Even in the non-coverage zone 214, the receiver of the wireless communications device remains active (i.e., powered on) to locate a full coverage zone. Thus, the receiver is always on in all areas. The receiver cannot, however, receive anything in the non-coverage area.

Figure 3:
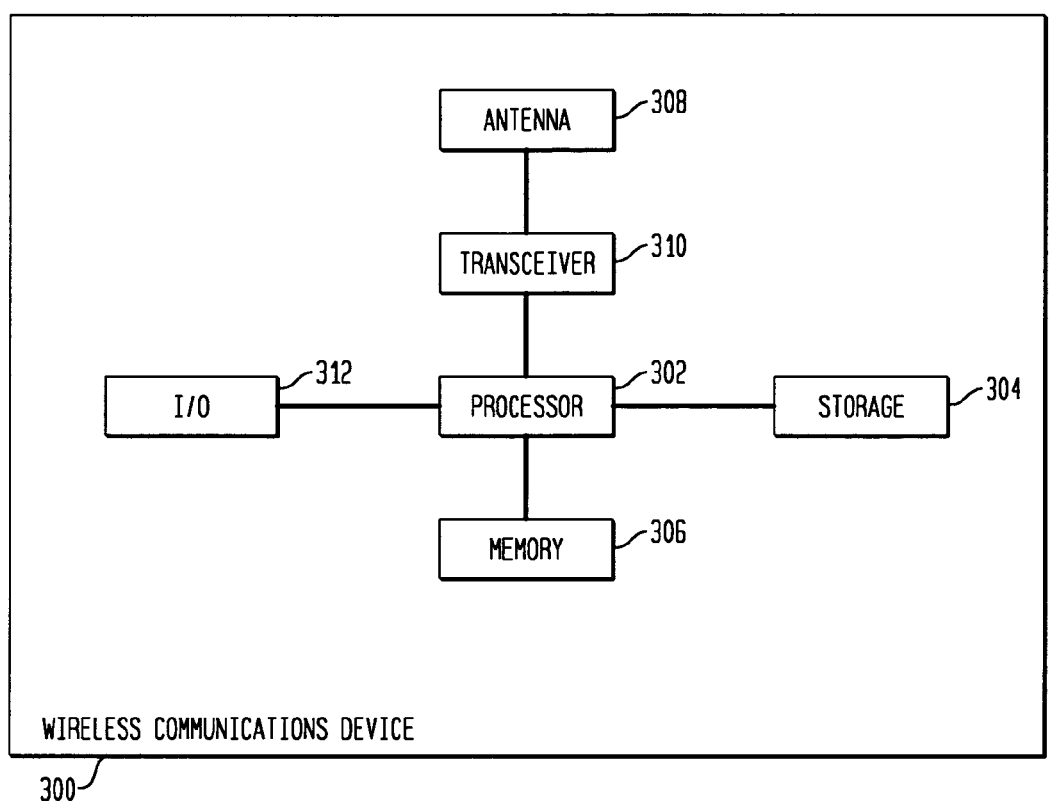
FIG. 3 shows a high level block diagram of a wireless communications device which may be used in an embodiment of the invention.

FIG. 3 shows a high level block diagram of a computer implementation of a mobile wireless communications device 300. Wireless communications device 300 contains a processor 302 which controls the overall operation of the wireless communications device 300 by executing computer program instructions which define such operation. The computer program instructions may be stored in a storage device 304 (e.g., read only memory (ROM) or electrically erasable programmable ROM (EEPROM)) and loaded into memory 306 when execution of the computer program instructions is desired. Thus, the wireless device operation will be defined by computer program instructions stored in memory 306 and/or storage 304 and the wireless communications device 300 will be controlled by processor 302 executing the computer program instructions. Wireless communications device 300 also includes an antenna 308 that enables wireless communications and a transceiver 310 (i.e., transmitter and receiver) for transmitting and receiving wireless communications. Although shown as a single block, the transmitter and receiver may be implemented as separate components. The transmitter and receiver are separately controllable. Wireless communications device 300 also includes input/output 312 which represents devices which allow for user interaction with the wireless communications device 300 (e.g., display, keyboard, mouse, speakers, buttons, etc.). One skilled in the art will recognize that an implementation of an actual device will contain other components as well, and that FIG. 3 is a high level representation of some of the components of such a computer for illustrative purposes.

Figure 4:
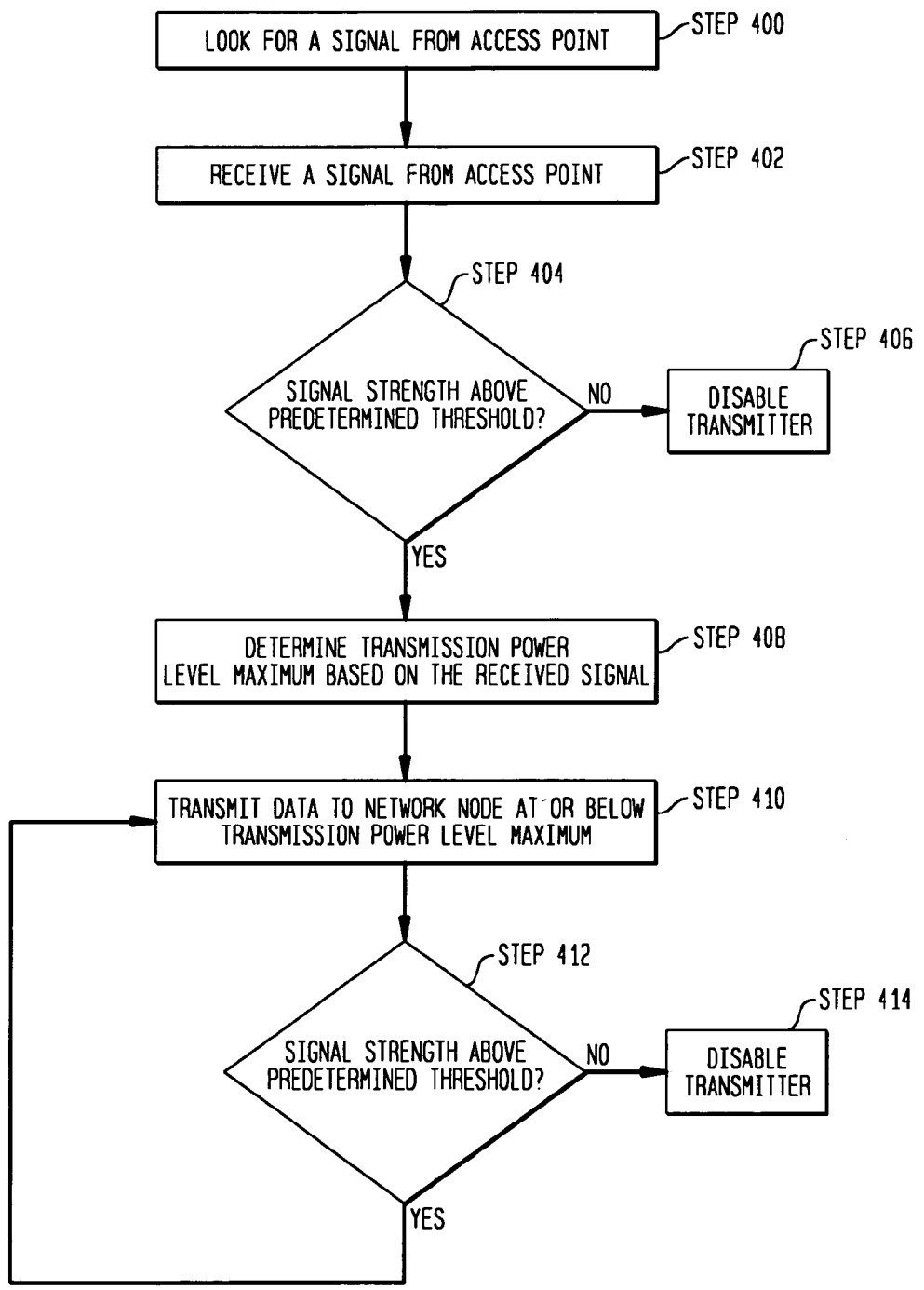
FIG. 4 is a flowchart showing the steps performed by a wireless communications device in accordance with an embodiment of the invention.

FIG. 4 is a flowchart showing the steps performed by a wireless communications device in accordance with an embodiment of the invention. FIG. 5 shows one embodiment of a data structure which may be stored in a database of the wireless communications device 300 for use in conjunction with the steps of FIG. 4 as described below. The database contains a relational database 500 containing multiple records, with each record comprising multiple fields.

The wireless communications device 300, with its transmitter initially turned off, looks for a signal from an authorized access point in step 400. When the transmitter is in range of an access point, it receives a signal from the access point in step 402. As part of the signal, the access point may transmit an identifier to the wireless communications device 300. For example, the identifier may be a MAC address (field 502) associated with the access point. Thus, the wireless communications device 300 determines whether the access point is an authorized access point based on the MAC address.

The wireless communications device 300 then determines in step 404 whether the strength of the signal is above a predetermined threshold. Field 504 shows examples of the signal strength threshold needed by the wireless communications device 300 to enable its transmitter when communicating with an access point having an SSID designated in field 502. The signal strength threshold may be set in the software of the wireless communications device 300. The signal strength threshold can be based on a percentage of a full strength received signal. Thus, a mobile wireless communications device 300 may receive 80% of the transmitted signal when close to the access point and may only receive 20% of the transmitted signal when further away from the access point. Additionally, each wireless communications device 300 may have different signal strength thresholds for each access point, as the signal strength threshold may vary based on the receiving signal sensitivity of the transceiver 310 of the wireless communications device 300.

If a wireless communications device 300 receives signals from multiple access points, the wireless communications device 300 selects the access point from which it is receiving the strongest signal. In one embodiment, the access point accommodates power output settings in the range from −3 dB to 20 dB in increments of 1 dB. After it selects an access point to communicate with, the wireless communications device 300 then determines if the signal strength of the received signal is above the predetermined threshold in step 404.

If the signal strength is below the predetermined threshold, the wireless communications device 300 disables its transmitter in step 406 because the wireless communications device 300 is in a limited coverage zone or a non-coverage zone. The wireless communications device 300 then returns to step 400 and again begins looking for a signal from an access point.

If the wireless communications device 300 determines that the signal strength is above the predetermined threshold, then the device 300 is in a full coverage zone. In step 408, the wireless communications device 300 turns its transmitter on and then determines a transmission power level maximum based on the signal received from the access point. Exemplary transmission power level maximums are illustrated in field 506. As described above, the transmission power level maximum is the maximum power level at which the wireless communications device 300 will transmit at in a particular area. In one embodiment, the wireless communications device 300 determines the transmission power level maximum from data contained in the received signal from the access point. Thus, the access point transmits the transmission power level maximum (or a transmission power level) as part of the signal.

Alternatively, the wireless communications device 300 sets its transmission power level to a predetermined value based on the MAC address of the access point (received in the signal from the access point). Thus, as part of a beacon signal, the access point can transmit its SSID to the wireless communications device 300. The wireless communications device 300 receives the SSID from the access point signal and performs a database lookup to first determine whether the wireless communications device 300 can communicate with the access point (i.e., whether it is an authorized access point and the received SSID matches an SSID stored in the database 500). Once the wireless communications device 300 determines that the received SSID matches an SSID in the database 500, the wireless communications device 300 performs a database lookup to determine the transmission power level to transmit at.

In one embodiment, the wireless communications device 300 selects the minimum of the transmission power output level specified by the access point and the transmission power level stored in field 506 of the database 500 for the access point that the wireless communications device 300 is communicating with. In one embodiment, the wireless communications device 300 supports multiple transmission power settings for a single access point. For example, if the access point specifies that the wireless communications device 300 has to transmit at no more than 13 dBm, but the wireless communications device 300 only supports power levels of −3, 3, 9, 14, and 20 dBm, the wireless communications device 300 selects 9 dBm as its transmission output power level.

The wireless communications device 300 then transmits one or more signals to the access point at or below the transmission power level maximum in step 410. During (and/or after) its transmission of these signals, the wireless device 300 periodically checks, in step 412, whether the strength of the signal received from the access point is above the predetermined threshold. If the signal strength remains above the predetermined threshold, the wireless communications device 300 continues to transmit signals because the wireless device 300 is within a full coverage zone. When the mobile wireless device 300 moves away from the full coverage zone and, consequently, the strength of the received signal falls below the predetermined threshold, the wireless device 300 disables its transmitter in step 414. The wireless device 300 then returns to step 400 and again looks for a signal from an access point.

Records 512-520 show exemplary records which may be stored in database 500. For example, record 512 indicates that the MAC address of an access point is 006097981E6B and the transmission power level associated with the access point is −3 decibels relative to a milliwatt (dBm). Further, the signal strength threshold required to enable transmission from the wireless communications device to the access point is 25% of the maximum signal strength output from the access point. Record 514 indicates that the MAC address of another access point is 00609912FEB2 and the transmission power level associated with this access point is 3 dBm. The signal strength threshold to enable transmissions is 20% of the maximum signal strength output from the access point.

There are many advantages associated with the present invention. For example, in a telecommunications building (or any other building) having sensitive electronic equipment, a user of the wireless communications device 300 no longer has to walk to a terminal to obtain a list of jobs that the user has to work on or to update the status of a job that the user has worked on or completed. Instead, the user can update the status or obtain the next job to work on via the wireless communications device 300. Moreover, the telecommunications provider can begin billing for a completed job once the wireless communications device 300 transmits the completed status to an access point.

Additionally, a user of the wireless communications device 300 can track and report information, such as time spent working on a project or experiment results, via the wireless communications device 300. The wireless communications device 300 can communicate this information to the access point when the wireless communications device 300 enters a full coverage zone.

Further, people having a wireless communications device on separate ends of a floor of, for example, a nuclear power plant can communicate without causing interference to the equipment (e.g., a nuclear reactor or associated control/monitor equipment). In another example, the area may be a hospital having sensitive medical equipment (e.g., heart monitors). A nurse may use the wireless communications device 300 to notify a doctor, for example, that the nurse performed a preliminary check (e.g., weight, height, etc.) on a particular patient, even in medical areas/facilities containing sensitive medical equipment. This invention can also be applied in a research laboratory. A lab technician performing research on, e.g., toxic chemicals (e.g., using sensitive equipment) can communicate wirelessly in the area housing the chemicals/equipment.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for reducing interference associated with wireless communication, said method comprising:
   receiving, from an access point, a signal having a signal strength above a predetermined threshold;
   determining a transmission power level maximum based on said received signal;
   transmitting a signal to said access point at a transmission power level at or below said transmission power level maximum; and
   disabling said transmission when said signal strength falls below said predetermined threshold.

2. The method of claim 1 wherein said determining step further comprises determining said transmission power level maximum directly from said signal received from said access point.

3. The method of claim 1 wherein said determining step further comprises determining an access point identifier from said signal received from said access point.

4. The method of claim 3 further comprising using said access point identifier to retrieve at least one of said transmission power level and signal strength threshold from a database.

5. The method of claim 1 wherein said received signal has a signal strength above said predetermined threshold in a full coverage zone.

6. The method of claim 1 wherein said signal strength falls below said predetermined threshold in one of a limited coverage zone and a non-coverage zone.

7. A wireless communications device comprising:
   a receiver for receiving, from an access point, a signal having a signal strength above a predetermined threshold;
   a processor for determining a transmission power level maximum based on said received signal; and
   a transmitter for transmitting a signal to said access point at or below said transmission power level maximum,
   wherein said processor disables said transmitter when said signal strength falls below said predetermined threshold.

8. The wireless communications device of claim 7 wherein said processor determines said transmission power level maximum directly from said signal received from said access point.

9. The wireless communications device of claim 7 further comprising a database storing a list of at least one of access point identifiers, signal strength thresholds, and transmission power levels.

10. The wireless communications device of claim 9 wherein said processor determines an access point identifier from said signal received from said access point.

11. The wireless communications device of claim 10 wherein said processor compares said determined access point identifier with said list of access point identifiers.

12. The wireless communications device of claim 11 wherein said processor determines at least one of signal strength threshold and transmission power level from said comparison.

13. The wireless communications device of claim 7 wherein said received signal has a signal strength above said predetermined threshold in a full coverage zone.

14. The wireless communications device of claim 7 wherein said signal strength falls below said predetermined threshold in one of a limited coverage zone and a non-coverage zone.

15. A wireless communications device comprising:
   means for receiving, from an access point, a signal having a signal strength above a predetermined threshold;
   means for determining a transmission power level maximum based on said received signal;
   means for transmitting a signal to said access point at a transmission power level at or below said transmission power level maximum; and
   means for disabling said transmission when said signal strength falls below said predetermined threshold.

16. The wireless communications device of claim 15 wherein said determining means further comprises means for determining said transmission power level maximum directly from said signal received from said access point.

17. The wireless communications device of claim 15 further comprising means to store a list of at least one of access point identifiers, signal strength thresholds, and transmission power levels.

18. The wireless communications device of claim 17 wherein said determining means determines an access point identifier from said signal received from said access point.

19. The wireless communications device of claim 18 wherein said determining means further comprises comparison means to compare said determined access point identifier with said list of access point identifiers.

20. The wireless communications device of claim 19 wherein said determining means determines at least one of signal strength threshold and transmission power level from said comparison.

* * * * *

UNITED STATES PATENT AND TRADEMARK OFFICE
CERTIFICATE OF CORRECTION

PATENT NO. : 7,359,730 B2 Page 1 of 1
APPLICATION NO. : 11/118673
DATED : April 15, 2008
INVENTOR(S) : Gary J. Dennis, Steven M. Cohen and James L. Dixon It is certified that error appears in the above-identified patent and that said Letters Patent is hereby corrected as shown below:

On the Title Page Item (73) Assignee:, change "Telecordia" to --Telcordia--.

Signed and Sealed this

Fourteenth Day of October, 2008

JON W. DUDAS
*Director of the United States Patent and Trademark Office*